United States Patent
Givoni et al.

(10) Patent No.: US 10,693,868 B2
(45) Date of Patent: Jun. 23, 2020

(54) EHN VENUE-SPECIFIC APPLICATION PROVISIONING

(71) Applicant: ARRIS Enterprises LLC, Suwanee, CA (US)

(72) Inventors: Doron Givoni, San Jose, CA (US); Henry H. Tzeng, San Jose, CA (US); Steve A. Martin, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 154 days.

(21) Appl. No.: 15/558,523

(22) PCT Filed: Dec. 30, 2015

(86) PCT No.: PCT/US2015/068181
§ 371 (c)(1),
(2) Date: Sep. 14, 2017

(87) PCT Pub. No.: WO2016/160085
PCT Pub. Date: Oct. 6, 2016

(65) Prior Publication Data
US 2018/0083949 A1    Mar. 22, 2018

Related U.S. Application Data

(60) Provisional application No. 62/155,324, filed on Apr. 30, 2015, provisional application No. 62/141,159, filed on Mar. 31, 2015.

(51) Int. Cl.
*H04L 29/06* (2006.01)
*H04W 12/06* (2009.01)
(Continued)

(52) U.S. Cl.
CPC ............ *H04L 63/083* (2013.01); *H04L 63/06* (2013.01); *H04L 63/107* (2013.01);
(Continued)

(58) Field of Classification Search
CPC ...... H04L 63/083; H04L 63/06; H04L 63/107
(Continued)

(56) References Cited

U.S. PATENT DOCUMENTS

| 6,944,761 B2 | 9/2005 | Wood | 713/155 |
|---|---|---|---|
| 8,494,576 B1 * | 7/2013 | Bye | G07C 9/00087 455/550.1 |

(Continued)

FOREIGN PATENT DOCUMENTS

| WO | 2012/036992 A2 | 3/2012 | |
|---|---|---|---|
| WO | WO 2012/036992 | 3/2012 | H04L 9/32 |

OTHER PUBLICATIONS

European Examination Report, Re: Application No. 15888069.0, dated Sep. 27, 2018.
(Continued)

*Primary Examiner* — Anthony D Brown
(74) *Attorney, Agent, or Firm* — Steven Stupp; Stewart Wiener (57) ABSTRACT

In order to leverage an enterprise-hosted network (EHN) associated with an entity, a communication technique may dynamically customize an application on a portable electronic device. In particular, the portable electronic device may discover and then may connect to the EHN using a quarantine zone that restricts access to the EHN. After providing valid credentials to establish a level of trust with the EHN, the portable electronic device may receive a request for authentication and authorization information. In response to the request, the portable electronic device may provide a credential to the EHN. Next, the portable electronic device may receive provisioning information that customizes the application on the portable electronic device to a venue associated with the entity. The provisioning information may include a connection setting associated with the application on the portable electronic device, which
(Continued)

allows the portable electronic device to connect to the EHN outside of the quarantine zone.

20 Claims, 4 Drawing Sheets

(51) Int. Cl.
*H04W 48/04* (2009.01)
*H04W 12/08* (2009.01)
*H04W 12/00* (2009.01)
*H04W 12/04* (2009.01)
*H04W 4/029* (2018.01)
*H04W 88/02* (2009.01)
*H04W 4/50* (2018.01)
*H04B 1/3827* (2015.01)

(52) U.S. Cl.
CPC . *H04W 12/0023* (2019.01); *H04W 12/04031* (2019.01); *H04W 12/06* (2013.01); *H04W 12/08* (2013.01); *H04W 48/04* (2013.01); *H04B 1/3827* (2013.01); *H04W 4/029* (2018.02); *H04W 4/50* (2018.02); *H04W 12/00503* (2019.01); *H04W 88/02* (2013.01)

(58) Field of Classification Search
USPC .............................................................. 726/7
See application file for complete search history.

(56) References Cited

U.S. PATENT DOCUMENTS

| | | | |
|---|---|---|---|
| 8,707,395 B2 | 8/2014 | Sahay | 726/4 |
| 2011/0106708 A1 | 5/2011 | Herwig | 705/50 |
| 2012/0131685 A1* | 5/2012 | Broch | G06F 21/554 |
| | | | 726/30 |
| 2012/0266239 A1 | 10/2012 | Bradley, II | 726/21 |
| 2013/0024921 A1 | 1/2013 | Gupta | 726/6 |
| 2013/0196697 A1* | 8/2013 | Lew | H04W 4/21 |
| | | | 455/466 |
| 2013/0305333 A1* | 11/2013 | Katzer | G06F 21/6245 |
| | | | 726/7 |
| 2014/0128050 A1 | 5/2014 | Bas Sanchez | 455/418 |

OTHER PUBLICATIONS

International Search Report and Written Opinion for PCT/US2015/068181, dated Apr. 19, 2016.
Extended European Search Report, European Patent Application 15888069.0, dated Jan. 11, 2019.

* cited by examiner

EHN VENUE-SPECIFIC APPLICATION PROVISIONING

CROSS REFERENCE TO RELATED APPLICATIONS

This application claims priority under 35 U.S.C. § 371 to International Patent Application No. PCT/US15/68181, "EHN Venue-Specific Application Provisioning," by Doron Givoni et al., filed on Dec. 30, 2015, which claims priority to U.S. Provisional Patent Application No. 62/155,324, "Enterprise-Hosted-Network Venue-Specific Application Provisioning," by Doron Givoni et al., filed on Apr. 30, 2015, and to U.S. Provisional Patent Application No. 62/141,159, "Neutral-Host Network Venue-Specific Application Provisioning," by Doron Givoni et al., filed Mar. 31, 2015, the contents of each of which are herein incorporated by reference.

BACKGROUND

Field

The described embodiments relate to techniques for communicating information among electronic devices. In particular, the described embodiments relate to techniques for provisioning an application on a portable electronic device via an enterprise-hosted network (EHN).

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

While many electronic devices communicate with each other via large networks owned by a network operator, small-scale networks associated with entities (such as a company or an organization) are increasingly common. In principle, an application executing on an electronic device can access such a small-scale network to provide a service to a user of the electronic device. However, in practice it is often difficult to provision the application on the electronic device so that the electronic device can communicate using the small-scale network.

SUMMARY

The described embodiments relate to a portable electronic device that receives provisioning information. This portable electronic device includes an interface circuit that, during operation, communicates with other electronic devices in an enterprise-hosted network (EHN) associated with an entity. During operation, the portable electronic device discovers the EHN, and then connects to the EHN using a quarantine zone, where the quarantine zone restricts access to the EHN. Moreover, the portable electronic device provides valid credentials to establish a level of trust with the EHN. Next, the portable electronic device optionally receives a request for authentication and authorization information. In response to the request or independently (if a request is not received), the portable electronic device provides a credential to the EHN. Furthermore, the portable electronic device receives the provisioning information that customizes an application on the portable electronic device to a venue associated with the entity, where the provisioning information allows the portable electronic device to connect to the EHN outside of the quarantine zone.

Note that the EHN may include a small cell that communicates information using Long Term Evolution.

Moreover, the EHN may be operated by the entity.

Furthermore, the credentials may include a username and a password.

Additionally, the provisioning information may include a connection setting associated with a connection-manager application on the portable electronic device. This connection setting may allow the portable electronic device to connect to the EHN outside of the quarantine zone via a customized extension of the portable electronic device. Note that the connection setting may include the customized extension of the portable electronic device. Moreover, the portable electronic device may connect to the EHN using the connection setting. For example, the connection setting may include an encryption key.

In some embodiments, during operation the portable electronic device receives a policy credential associated with the connection-manager application, and the policy credential specifies conditions when the portable electronic device connects to the EHN via the customized extension.

Furthermore, the customized connection may include a customized telephone number, and the customized telephone number may allow the portable electronic device to receive incoming calls and to provide outgoing calls via the customized telephone number.

Additionally, the connection setting may repurpose a key on a keypad in a dialer user interface to dial a service associated with the venue.

In some embodiments, the connection setting defines an electronic room key that facilitates access to a room at the venue.

Moreover, the provisioning information may include a connection setting associated with a hospitality application on the portable electronic device, and the connection setting enables remote check-in at the venue when the portable electronic device is proximate to the venue.

Furthermore, the portable electronic device may include an antenna electrically coupled to the interface circuit.

Additionally, the portable electronic device may include: a processor; and a memory, coupled to the processor, which stores a program module that, during operation, is executed by the processor. The program module may include instructions for at least some of the operations performed by the portable electronic device.

Note that the portable electronic device may automatically launch the application when the portable electronic device connects to the EHN.

Another embodiment provides a computer-program product for use with the portable electronic device. This computer-program product includes instructions for at least some of the operations performed by the portable electronic device.

Another embodiment provides a method. This method includes at least some of the operations performed by the portable electronic device.

This Summary is provided merely for purposes of illustrating some exemplary embodiments, so as to provide a basic understanding of some aspects of the subject matter described herein. Accordingly, it will be appreciated that the above-described features are merely examples and should

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to leverage an enterprise-hosted network (EHN) associated with an entity, a communication technique may dynamically customize an application on a portable electronic device. In particular, the portable electronic device may discover and then may connect to the EHN using a quarantine zone that restricts access to the EHN. After providing valid credentials to establish a level of trust with the EHN, the portable electronic device may receive a request for authentication and authorization information. In response to the request, the portable electronic device may provide a credential or certificate to the EHN. Next, the portable electronic device may receive provisioning information that customizes the application on the portable electronic device to a venue associated with the entity. The provisioning information may include a connection setting associated with the application on the portable electronic device, which allows the portable electronic device to connect to the EHN outside of the quarantine zone. For example, the connection setting may allow the portable electronic device to connect to the EHN outside of the quarantine zone via a customized extension of the application on the portable electronic device.

This communication technique may allow the portable electronic device to be securely and dynamically configured to leverage the EHN to provide customized capabilities while the portable electronic device is at or proximate to the venue. For example, the customized extension of the portable electronic device may include a customized telephone number that allows the portable electronic device to receive incoming calls and to provide outgoing calls via the customized telephone number. Alternatively or additionally, the customized extension of the portable electronic device may include: repurposing a key on a keypad in a dialer user interface of the portable electronic device to dial a service associated with the venue; defining an electronic room key via the portable electronic device that facilitates access to a room at the venue; and/or enabling remote check-in at the venue when the portable electronic device is proximate to the venue.

Thus, the communication technique may facilitate value-added services that improve the user experience when using the portable electronic device. Consequently, the communication technique may increase customer satisfaction and, therefore, may increase revenue and/or profitability of the entity.

In the discussion that follows, the portable electronic device may include a radio that communicates packets in accordance with a communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Long Term Evolution (LTE) is used as an illustrative example. However, a wide variety of communication protocols (such as Wi-Fi, cellular or others) may be used.

A cellular-telephone network may include base stations (and associated cell towers) that implement so-called 'macro cells.' These macro cells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce cross-talk or interference between the signals transmitted by different cell towers and/or different macro cells.

However, there are often gaps in the coverage offered by macro cells. Consequently, some users operate local transceivers that provide short-range communication in the cellular-telephone network. These so-called 'femto cells' provide short-range communication (e.g., up to 10 m) for a few individuals.

In addition, larger entities or organizations (such as those with 50-60 users) may operate local transceivers that provide communication in the cellular-telephone network over a range of 100 m. This intermediate-range coverage in the cellular-telephone network is typically referred to as a 'small cell.'

Recently, entities have established or hosted small cells based on a data communication protocol, such as LTE. (However, as noted previously, a wide variety of communication techniques or protocols may be used to implement a small cell, such as those used in cellular systems or communicate with a radio access network and are not limited to LTE.) These small cells are examples of enterprise-hosted networks or EHNs (which are sometimes referred to as 'neutral-host networks), i.e., networks that are hosted by entities other than a network operator (such as a cellular-telephone carrier).

In principle, a small cell that implements an LTE network can allow an entity (such as a company or an enterprise) to provide a wide variety of services. However, one challenge is how to onboard electronic devices to such a small-cell LTE network. For example, if a company hosts a small-cell LTE network, it can be challenging for the company to provision the employee's personal electronic devices (such as their cellular telephones and, more generally, their portable electronic devices) so that they can access and use this network. In particular, typically in LTE a user buys an electronic device with a subscriber identification module or SIM (or the user buys the SIM at some other point of sale). This SIM allows the users to connect to the LTE network. In contrast, in an EHN, the local venue usually is not setup to issue its own SIMs, but may be interested to provide a way to onboard devices in more of a self-service manner (such as Bring Your Own Device).

To address this problem, the communication technique provisions an individual's portable electronic device so that the portable electronic device can connect with and use a small-cell LTE network associated with an entity. In addition, the communication technique may provision an application on the portable electronic device so that it is customized to a venue associated with the entity. This capability may allow the entity to repurpose the portable electronic device to facilitate a variety of user experiences that are better suited for that venue/enterprise.

As described further below, this customization may allow the entity to have its own private branch voice exchange. For example, after provisioning, a connection-manager application (or a dialer application) on the portable electronic device may allow the portable electronic device to receive incoming telephone calls and to initiate outgoing telephone calls using a customized telephone extension (which may not exist elsewhere). Thus, an outgoing telephone call may appear to come from an extension associated with the entity, even though the telephone call originates on the portable electronic device. Alternatively or additionally, after provisioning, the connection-manager application on the portable electronic device may allow the portable electronic device to receive incoming telephone calls that are also routed to an individual's office telephone. In some embodiments, the communication technique provisions the connection-manager application so that a key on a keypad in a dialer user interface is repurposed to dial a service associated with the venue (e.g., dialing '0' on the individual's cellular telephone may call the front desk of a hotel as the electronic device on boarded to the Hotel EHN and that was provisioned with venue-specific application/settings). Consequently, the communication technique may allow integration of the portable electronic device into enterprise voice services via the small-cell LTE network.

Moreover, the communication technique may provision applications other than the connection-manager application. For example, the communication technique may provision an access application on the portable electronic device, so that the portable electronic device functions as an electronic room key that facilitates access to a room at the venue (such as the hotel). Similarly, the communication technique may provision a hospitality application on the portable electronic device, so that the portable electronic device initiates remote check-in at the venue (such as the hotel) when the portable electronic device is enroute to the venue (such as driving to the venue), proximate to the venue (such as within 50-100 ft. of an entrance) and/or in the venue (such as in the lobby). In some embodiments, the provisioning of the application on the portable electronic device facilitates a loyalty program associated with the venue or the entity.

More generally, the communication technique may provision an application on the portable electronic device based on a context, such as a location of the portable electronic device. This capability may allow or enable transient applications on the portable electronic device. For example, a large number of applications may be installed on the portable electronic device. However, rather than displaying virtual icons associated with all of the applications on a display in the portable electronic device, only a subset of the installed applications that are relevant to a particular location (such as the venue, a building, an airport, a hotel, a hospital, a sporting arena, etc.), the entity (such as a company) and/or a context (such as what the user is doing or wants to do, a topic or metadata associated with an application or an activity, etc.) may be displayed. (The remaining applications may be hidden, or a given one of these applications may only be displayed or visible to the user if a user manually activates it, e.g., using a user interface on the portable electronic device.) Thus, the installed applications may selectively appear (or disappear) from a display in the portable electronic device as needed, such as based on the location, the venue, the entity and/or the context.

Figure 1:
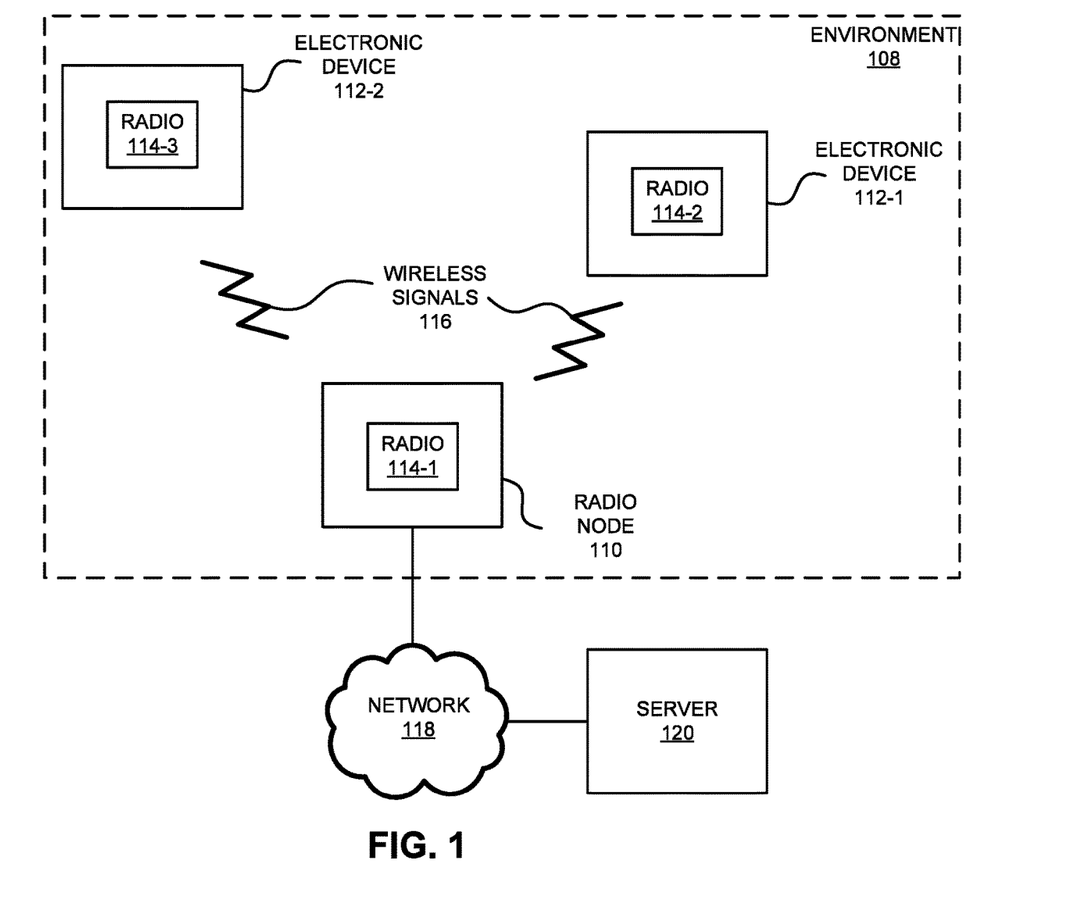
FIG. 1 is a block diagram illustrating electronic devices wirelessly communicating in accordance with an embodiment of the present disclosure.

We now further describe communication among electronic devices, including the portable electronic device. FIG. 1 presents a block diagram illustrating a radio node 110 (such as a transceiver or an electronic device that is associated with a small cell that communicates using LTE, e.g., it may provide at least some of the functionality of an eNode-B, in an EHN associated with or provided by an entity) and electronic devices 112 (such as a portable electronic device, e.g., a cellular telephone or a smartphone) wirelessly communicating in an environment 108 (such as a venue associated with the entity) according to some embodiments. In particular, these electronic devices may wirelessly communicate while: transmitting advertising frames on wireless channels, detecting one another by scanning wireless channels, establishing connections (for example, by transmitting association requests), and/or transmitting and receiving packets (which may include the association requests and/or additional information as payloads).

Figure 4:
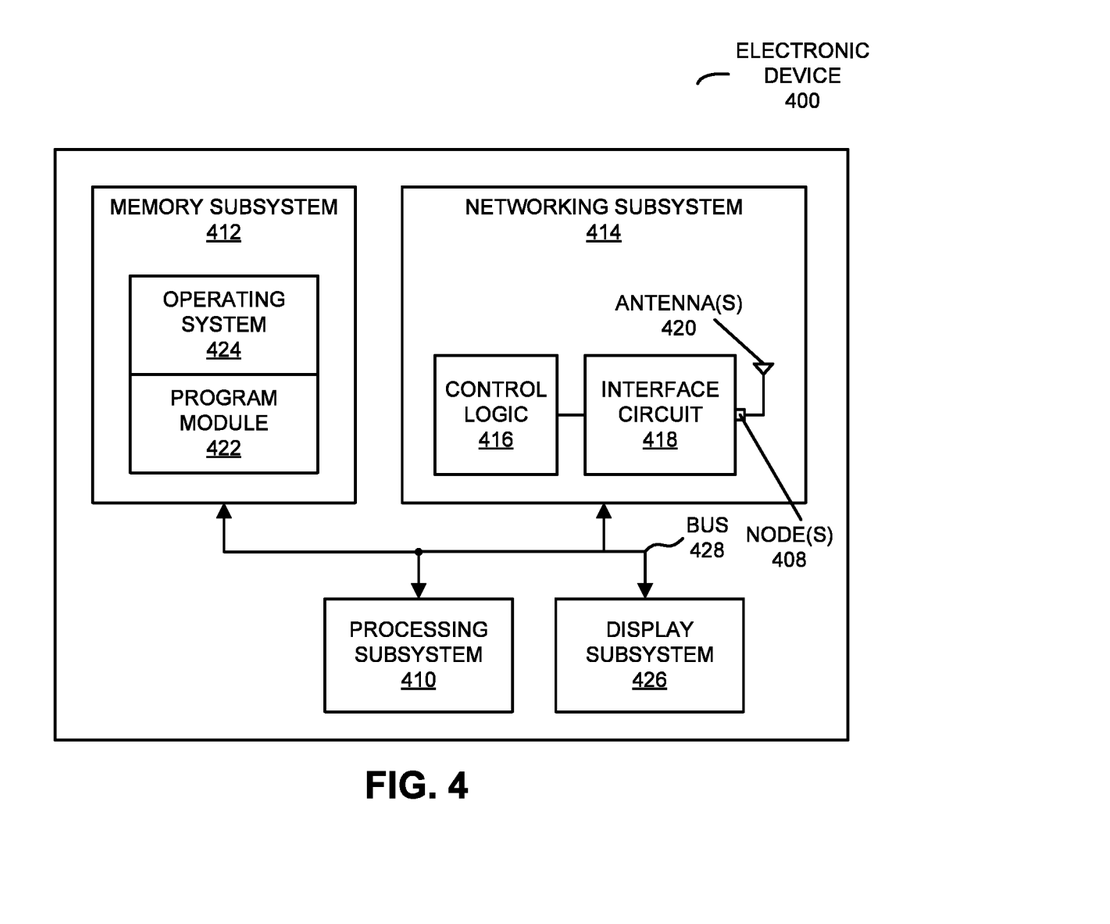
FIG. 4 is a block diagram illustrating an electronic device in accordance with an embodiment of the present disclosure.

As described further below with reference to FIG. 4, radio node 110 and electronic devices 112 may include subsystems, such as a networking subsystem, a memory subsystem and a processor subsystem. In addition, radio node 110 and electronic devices 112 may include radios 114 in the networking subsystems. More generally, radio node 110 and electronic devices 112 can include (or can be included within) any electronic devices with the networking subsystems that enable radio node 110 and electronic devices 112 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 114 are shown in radio node 110 and electronic devices 112, one or more of these instances may be different from the other instances of radios 114.

As can be seen in FIG. 1, wireless signals 116 (represented by jagged lines) are transmitted from radio 114-1 in radio node 110. These wireless signals 116 may be received by radios 114 in one or more of the other electronic devices 112 (such as electronic device 112-1). In particular, radio node 110 may transmit packets. In turn, these packets may be received by the one or more of electronic devices 112. Moreover, radio node 110 may allow electronic devices 112 to communicate with other electronic devices, computers and/or servers (such as server 120) via network 118 (such as a cellular-telephone network and/or a wireless network).

Note that the communication between radio node 110, electronic device 112-1 and/or electronic device 112-2 may be characterized by a variety of performance metrics, such as: a received signal strength (RSS), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Figure 2:
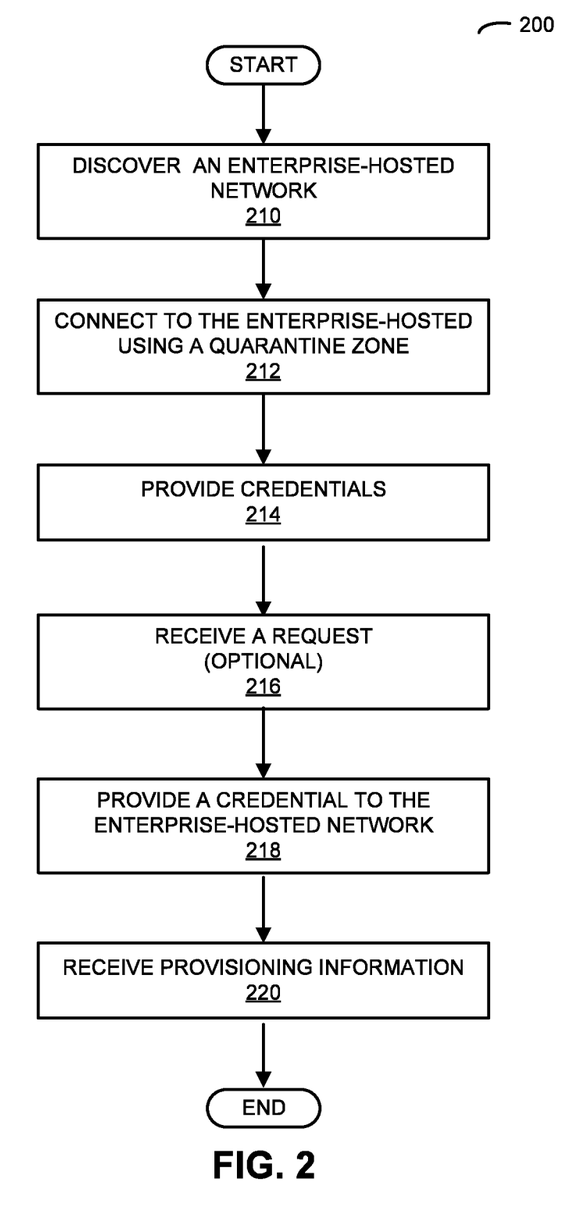
FIG. 2 is a flow diagram illustrating a method for receiving provisioning information in accordance with an embodiment of the present disclosure.

As discussed further below with reference to FIGS. 2 and 3, in the communication technique, an interface circuit in an electronic device (such as electronic device 112-1) may perform at least some of the operations in the communication technique.

In the described embodiments, processing a packet or frame in radio node 110 and/or electronic devices 112 includes: receiving wireless signals 116 with the packet or frame; decoding/extracting the packet or frame from received wireless signals 116 to acquire the packet or frame; and processing the packet or frame to determine information contained in the packet or frame (such as provisioning information for the EHN).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

We now describe embodiments of the method. FIG. 2 is a flow diagram illustrating a method 200 for receiving provisioning information according to some embodiments, which may be performed by a portable electronic device (such as one of electronic devices 112 in FIG. 1). During operation, the portable electronic device discovers an EHN (operation 210) associated with an entity. Then, the portable electronic device connects to the EHN using a quarantine zone (operation 212), where the quarantine zone restricts access to the EHN (i.e., the portable electronic device may have limited access to the EHN). For example, the quarantine zone may be a bounded or isolated in the EHN and its associated memory. Moreover, functionality in the quarantine zone may be a subset of the full functionality of the EHN, and inputs to and outputs from the quarantine zone may be restricted to limited types of information that are used to establish trust and/or security with the EHN. Note that the EHN may include a small cell that communicates information using Long Term Evolution, and the EHN may be operated by the entity.

Moreover, the portable electronic device provides valid credentials (operation 214) to the EHN establish a level of trust with the EHN. This credential can include: a username and password on the venue active directory, a social media account on a social network, and other types of end-user or account identification. In some embodiments, anonymous access is granted based accepting the general terms and conditions of the EHN provider. In these embodiments, the EHN provider decides which of the terms and conditions are used to allow users to register with the EHN.

Next, the portable electronic device optionally receives a request (operation 216) for authentication and authorization information. Furthermore, the portable electronic device provides (or provisions) a credential (such as a certificate and/or a password) to the EHN (operation 218) in response to the request (if one is received) or independently (if a request is not received).

Additionally, the portable electronic device receives the provisioning information (operation 220) that includes application data (among other settings), which customizes an application on the portable electronic device to a venue associated with the entity, where the provisioning information allows the portable electronic device to connect to the EHN outside of the quarantine zone.

For example, the provisioning information may include a connection setting (or a connection credential or certificate) associated with a connection-manager application on the portable electronic device. This connection setting may allow the portable electronic device to connect to the EHN outside of the quarantine zone via a customized extension of the portable electronic device. Note that the connection setting may include the customized extension of the portable electronic device (and, more generally, information such as a user identifier and/or metadata).

Moreover, the provisioning information may include and/or may allow portable electronic device to receive settings and/or software. For example, the portable electronic device may receive a policy credential or certificate associated with the connection-manager application (such as in the provisioning information). The settings may specify conditions when the portable electronic device connects to the EHN via the customized extension. In particular, the portable electronic device may not attempt to connect to the EHN when a signal strength (such as a received signal strength indicator) is too low (such as less than −85 dBm). In some embodiments, the portable electronic device connects to the EHN using the connection credential or certificate (such as an encryption key, e.g., a public or asymmetric encryption key or a symmetric encryption key). Note that the customized connection may include a customized telephone number that allows the portable electronic device to receive incoming calls and/or to provide outgoing calls via the customized telephone number.

Alternatively or additionally, the provisioning information may include connection settings associated with a specific application on the portable electronic device, such as a connection credential or certificate associated with a connection-manager application on the portable electronic device. These connection settings may repurpose a key on a keypad in a dialer user interface to dial a service associated with the venue (such as the front desk or housekeeping). Furthermore, the provisioning information may include a set of configuration settings (which may include a connection credential or certificate) associated with an access application on the portable electronic device, where the configuration settings may define or specify an electronic room key that facilitates access to a room at the venue. In some embodiments, the provisioning information includes a connection setting (which may include a connection credential or certificate) associated with a hospitality application on the portable electronic device, where the connection setting enables remote check-in at the venue when the portable electronic device is proximate to the venue.

In some embodiments of method 200, there may be additional or fewer operations. For example, after the portable electronic device has been provisioned with credentials and applications, the application can automatically load (e.g., open on the portable electronic device) once the portable electronic device is in proximity to the EHN and the connection manager has auto-connected. This capability may facilitate a so-called 'transit application.' In particular, when a user on-boards their portable electronic device on to an EHN associated with a hotel, the hotel's mobile application can automatically load when the user connects to the EHN on their next visit to the hotel. Moreover, method 200 may include life-cycle management of the settings. This capability may allow an EHN to push and update settings to the portable electronic device, including revoking their right to access the EHN and/or installing a particular application.

In some embodiments, a voice application is provisioned on the portable electronic device, so that a native voice dialer on the portable electronic device may switch to a local telephone number on an EHN once the portable electronic device has connected to the EHN. Furthermore, the order of the operations may be changed, and/or two or more operations may be combined into a single operation.

Figure 3:
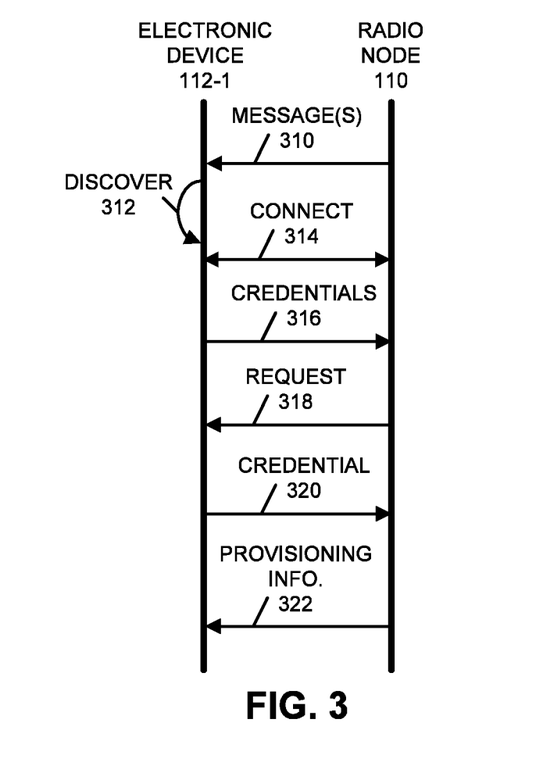
FIG. 3 is a drawing illustrating communication among the electronic devices in FIG. 1 in accordance with an embodiment of the present disclosure.

Embodiments of the communication technique are further illustrated in FIG. 3, which presents a drawing illustrating communication among radio node 110 and electronic device 112-1 according to some embodiments. In particular, radio node 110 may broadcast one or more messages 310 that include information about the EHN (such as information advertising the availability of the EHN). Based on the one or more messages 310, electronic device 112-1 may discover 312 the EHN, and then may connect 314 to the EHN via radio node 110 using a quarantine zone, where the quarantine zone restricts access to the EHN.

Moreover, electronic device 112-1 may provide valid credentials 316 to radio node 110 (and, thus, the EHN) to establish a level of trust with the EHN. Next, electronic device 112-1 may optionally receive a request 318 from radio node 110 for authentication and authorization information. Furthermore, electronic device 112-1 may provide (or provisions) a credential (such as a certificate) 320 (with authentication and/or authorization information) to radio node 110 (and, thus, the EHN) in response to request 318 or independently (when request 118 is not provided or received).

Additionally, electronic device 112-1 may receive provisioning information 322 that customizes an application on electronic device 112-1 to a venue associated with the entity, where provisioning information 322 allows electronic device 112-1 to connect, via radio node 110 (or another radio node in the EHN), to the EHN outside of the quarantine zone.

In an exemplary embodiment of the communication technique, an LTE small cell evolves to include EHNs. In an EHN, the enterprise/venue may onboard devices (such as a portable electronic device) to the network and then may issue them a connection credential or certificate to connect to the LTE EHN (which may provide a soft SIM). This can be done with or without operator intervention. The connection credential or certificate may include additional data, such as an enterprise voice extension. The portable electronic device may provide the connection credential or certificate (and, more generally, provisioning information with settings and data) to mobile-phone dialer application, so that incoming calls ring on the portable electronic device, and outgoing calls from look like they are from the enterprise extension.

Another example is that electronic devices could onboard to a hotel LTE EHN. Then, these electronic devices could dial '0' to get reception. Alternatively or additionally, a call to a customer's room can be routed to their mobile phone.

The communication technique may provide a unified voice-over LTE/voice-over Wi-Fi capability utilizing the enterprise-centric evolved packet core with associated IP multimedia subsystem (IMS) functionality via an untrusted SWu interface (a logical interface towards user equipment) or a trusted Ta interface leveraging capabilities in operating systems of portable electronic devices.

While the preceding discussion used cellular or mobile telephones as an illustration, the communication technique may be applied or used with a wide variety of electronic devices and communication protocols. For example, by pairing the LTE evolved packet core and IMS with hotspot 2.0 and credential or certificate-based onboarding of non-SIM-based devices, these services may be extended to Wi-Fi only devices (such as tablets and laptops). More generally, the communication technique may be used in the context of Wi-Fi.

Note that in the communication technique the on-boarding of an electronic device may be tied to the provisioning of the application. In particular, as the electronic device establishes its credential(s) with a wireless network, the application may be downloaded on to the electronic device (as opposed to being pre-installed on the electronic device). In addition, in the communication technique location awareness may be indirectly enabled by the network provider (such as the entity) in the venue (e.g., based on the presence of the electronic device in the venue), as opposed to an 'over the top' approach in which the location of the electronic device is explicitly determined, e.g., using a Global Positioning System (which may not be available, such as indoors). Instead, in the communication technique the wireless network may have the ability to push the application to the electronic device after the electronic device is on-boarded onto the wireless network.

We now describe embodiments of an electronic device, which may perform at least some of the operations in the communication technique. For example, the electronic device may include a portable electronic device that performs the operations in FIG. 1 or a transceiver or a server associated with a small cell (which may perform counterparts to the operations in FIG. 2). FIG. 4 presents a block diagram illustrating an electronic device 400 in accordance with some embodiments. This electronic device includes processing subsystem 410, memory subsystem 412, and networking subsystem 414. Processing subsystem 410 includes one or more devices configured to perform computational operations. For example, processing subsystem 410 can include one or more microprocessors, ASICs, microcontrollers, programmable-logic devices, and/or one or more digital signal processors (DSPs).

Memory subsystem 412 includes one or more devices for storing data and/or instructions for processing subsystem 410 and networking subsystem 414. For example, memory subsystem 412 can include dynamic random access memory (DRAM), static random access memory (SRAM), and/or other types of memory. In some embodiments, instructions for processing subsystem 410 in memory subsystem 412 include: one or more program modules or sets of instructions (such as program module 422 or operating system 424), which may be executed by processing subsystem 410. Note that the one or more computer programs may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including: control logic 416, an interface circuit 418 and one or more antennas 420 (or antenna elements). (While FIG. 4 includes one or more antennas 420, in some embodiments electronic device 400 includes one or more nodes, such as nodes 408, e.g., a pad, which can be coupled to the one or more antennas 420. Thus, electronic device 400 may or may not include the one or more antennas 420.) For example, networking subsystem 414 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, a transmit antenna radiation pattern of electronic device 400 may be adapted or changed using pattern shapers (such as reflectors) in one or more antennas 420 (or antenna elements), which can be independently and selectively electrically coupled to ground to steer the transmit antenna radiation pattern in different directions. Thus, if one or more antennas 420 includes N antenna-radiation-pattern shapers, the one or more antennas 420 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 400 may use the mechanisms in networking subsystem 414 for performing simple wireless communication between the electronic devices, e.g., transmitting advertising or beacon frames and/or scanning for advertising frames transmitted by other electronic devices as described previously.

Within electronic device 400, processing subsystem 410, memory subsystem 412, and networking subsystem 414 are coupled together using bus 428. Bus 428 may include an electrical, optical, and/or electro-optical connection that the subsystems can use to communicate commands and data among one another. Although only one bus 428 is shown for clarity, different embodiments can include a different number or configuration of electrical, optical, and/or electro-optical connections among the subsystems.

In some embodiments, electronic device 400 includes a display subsystem 426 for displaying information on a display, which may include a display driver and the display, such as a liquid-crystal display, a multi-touch touchscreen, etc.

Electronic device 400 can be (or can be included in) any electronic device with at least one network interface. For example, electronic device 400 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 400, in alternative embodiments, different components and/or subsystems may be present in electronic device 400. For example, electronic device 400 may include one or more additional processing subsystems, memory subsystems, networking subsystems, and/or display subsystems. Additionally, one or more of the subsystems may not be present in electronic device 400. Moreover, in some embodiments, electronic device 400 may include one or more additional subsystems that are not shown in FIG. 4. Also, although separate subsystems are shown in FIG. 4, in some embodiments some or all of a given subsystem or component can be integrated into one or more of the other subsystems or component(s) in electronic device 400. For example, in some embodiments program module 422 is included in operating system 424 and/or control logic 416 is included in interface circuit 418.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 414. The integrated circuit may include hardware and/or software mechanisms that are used for transmitting wireless signals from electronic device 400 and receiving signals at electronic device 400 from other electronic devices. Aside from the mechanisms herein described, radios are generally known in the art and hence are not described in detail. In general, networking subsystem 414 and/or the integrated circuit can include any number of radios. Note that the radios in multiple-radio embodiments function in a similar way to the described single-radio embodiments.

In some embodiments, networking subsystem 414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an LTE communication protocol as an illustrative example, in other embodiments a wide variety of cellular-telephone communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 422, operating system 424 (such as a driver for interface circuit 418) or in firmware in interface circuit 418. Alternatively or additionally, at least some of the operations in the communication technique may be implemented in a physical layer, such as hardware in interface circuit 418.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A portable electronic device, comprising:
an interface circuit configured to wirelessly communicate with other electronic devices in an enterprise-hosted network (EHN), wherein, the portable electronic device is configured to:
discover the EHN by receiving, at the interface circuit, a packet associated with the EHN, wherein the EHN comprises a network hosted by an entity that is other than an operator of a cellular-telephone network and is located at a venue, and wherein the discovery occurs when the portable electronic device is within wireless communication range of the EHN located at the venue;
connect to the EHN using a quarantine zone by providing and receiving second packets using the interface circuit, wherein the quarantine zone restricts access to the EHN;
provide, from the interface circuit, valid credentials for the EHN;
provide, from the interface circuit, a credential for the EHN; and
receive, at the interface circuit, provisioning information that customizes an application on the portable electronic device to the venue, wherein the provisioning information allows the portable electronic device to connect to the EHN outside of the quarantine zone.

2. The portable electronic device of claim 1, wherein the EHN comprises a small cell that communicates information using Long Term Evolution.

3. The portable electronic device of claim 1, wherein the credentials comprise a username and a password.

4. The portable electronic device of claim 1, wherein the portable electronic device is configured to receive, at the interface circuit, a request for authentication and authorization information.

5. The portable electronic device of claim 1, wherein the provisioning information comprises a connection setting associated with a connection-manager application on the portable electronic device; and
wherein the connection setting allows the portable electronic device to connect to the EHN outside of the quarantine zone via a customized extension of the portable electronic device.

6. The portable electronic device of claim 5, wherein the connection setting comprises the customized extension of the portable electronic device.

7. The portable electronic device of claim 5, wherein the portable electronic device is configured to receive, at the interface circuit, a policy credential associated with the connection-manager application; and
wherein the policy credential specifies conditions when the portable electronic device connects to the EHN via the customized extension.

8. The portable electronic device of claim 7, wherein the portable electronic device is configured to connect to the EHN by providing, from the interface circuit, the connection setting for the EHN.

9. The portable electronic device of claim 5, wherein the connection setting comprises an encryption key.

10. The portable electronic device of claim 5, wherein the customized connection comprises a customized telephone number; and
   wherein the customized telephone number allows the portable electronic device to receive incoming calls and to provide outgoing calls via the customized telephone number.

11. The portable electronic device of claim 1, wherein the provisioning information comprises a connection setting associated with a connection-manager application on the portable electronic device; and
   wherein the connection setting repurposes a key on a keypad in a dialer user interface to dial a service associated with the venue.

12. The portable electronic device of claim 1, wherein the provisioning information comprises a connection setting associated with an access application on the portable electronic device; and
   wherein the connection setting defines an electronic room key that facilitates access to a room at the venue.

13. The portable electronic device of claim 1, wherein the provisioning information comprises a connection setting associated with a hospitality application on the portable electronic device; and
   wherein the connection setting enables remote check-in at the venue when the portable electronic device is proximate to the venue.

14. The portable electronic device of claim 1, wherein the portable electronic device further comprises an antenna electrically coupled to the interface circuit.

15. The portable electronic device of claim 1, wherein the portable electronic device is configured to automatically launch the application when the portable electronic device connects to the EHN.

16. The portable electronic device of claim 1, wherein the portable electronic device further comprises:
   a processor; and
   a memory, coupled to the processor, which stores program instructions, wherein, when executed by the processor, the program instructions cause the portable electronic device to perform one or more of: the discovering, the connecting, the providing, the providing, and the receiving.

17. A non-transitory computer-readable storage medium for use in conjunction with a portable electronic device, the computer-readable storage medium storing program instructions, wherein, when executed by the portable electronic device, the program instructions cause the portable electronic device to receive provisioning information by performing one or more operations comprising:
   discovering the EHN by receiving, at an interface circuit in the portable electronic device and via wireless communication, a packet associated with the EHN, wherein the EHN comprises a network hosted by an entity that is other than an operator of a cellular-telephone network and is located at a venue, and wherein the discovery occurs when the portable electronic device is within wireless communication range of the EHN located at the venue;
   connecting to the EHN using a quarantine zone by providing and receiving second packets using the interface circuit, wherein the quarantine zone restricts access to the EHN;
   providing, from the interface circuit, valid credentials for the EHN;
   providing, from the interface circuit, a credential for the EHN; and
   receiving, at the interface circuit, the provisioning information that customizes an application on the portable electronic device to the venue, wherein the provisioning information allows the portable electronic device to connect to the EHN outside of the quarantine zone.

18. The computer-readable storage medium of claim 17, wherein the provisioning information comprises a connection setting associated with a connection-manager application on the portable electronic device; and
   wherein the connection setting allows the portable electronic device to connect to the EHN outside of the quarantine zone via a customized extension of the portable electronic device.

19. A method for receiving provisioning information, comprising:
   by a portable electronic device:
   discovering the EHN by receiving a packet associated with the EHN via wireless communication, wherein the EHN comprises a network hosted by an entity that is other than an operator of a cellular-telephone network and is located at a venue;
   connecting to the EHN using a quarantine zone by providing and receiving second packets, wherein the quarantine zone restricts access to the EHN, and wherein the discovery occurs when the portable electronic device is within wireless communication range of the EHN located at the venue;
   providing valid credentials for the EHN;
   providing a credential for the EHN; and
   receiving the provisioning information that customizes an application on the portable electronic device to the venue, wherein the provisioning information allows the portable electronic device to connect to the EHN outside of the quarantine zone.

20. The method of claim 19, wherein the provisioning information comprises a connection setting associated with a connection-manager application on the portable electronic device; and
   wherein the connection setting allows the portable electronic device to connect to the EHN outside of the quarantine zone via a customized extension of the portable electronic device.

* * * * *